United States Patent [19]

Brower et al.

[11] 3,955,213

[45] May 4, 1976

[54] INTERMEDIATE PRODUCT ASSEMBLY OF A MAGNETIC HEAD

[75] Inventors: Ralph D. Brower, Longmont; Neil L. Robinson, Boulder, both of Colo.

[73] Assignee: International Business Machines Corporation, Armonk, N.Y.

[22] Filed: Mar. 11, 1974

[21] Appl. No.: 450,138

[52] U.S. Cl. .............................. 360/122; 51/281 R
[51] Int. Cl.² ...................... G11B 5/22; E05F 11/02
[58] Field of Search .................... 360/122, 113, 112; 51/281 R, 165; 29/603

[56] References Cited
UNITED STATES PATENTS

| | | |
|---|---|---|
| 3,787,638 | 1/1974 | Murai ................................. 360/122 |
| 3,821,815 | 6/1974 | Abbott et al ........................ 360/122 |

*Primary Examiner*—Robert S. Tupper
*Attorney, Agent, or Firm*—Gunter A. Hauptman

[57] ABSTRACT

A head is moved toward and rotated against an abrasive while its resistance is monitored by a four-lead bridge. Prior to final manufacture, the head includes a highly conductive segment which surrounds the active head element on three sides and is electrically connected to it at one point. The segment is ground away during manufacture. Two leads from the head are connected to two slip rings, and each slip ring has two pairs of brushes, each wire from the bridge going to a different brush pair. Head movement toward the abrasive is terminated when a predetermined head resistance is detected by the bridge.

3 Claims, 6 Drawing Figures

INTERMEDIATE PRODUCT ASSEMBLY OF A MAGNETIC HEAD

CROSS-REFERENCES TO RELATED APPLICATIONS

Ser. No. 450,139, filed Mar. 11, 1974 "Magnetic Head Surface Formation," by L. A. Johnson, N. L. Robinson, R. H. Strang and G. G. Vair, and Ser. No. 450,137, filed Mar. 11, 1974 "Apparatus and Method for Controlling Magnetic Head Surface Formation," by S. T. Riddle and G. G. Vair filed on even date herewith, claim different aspects of the invention described herein.

The invention herein is an improvement over the apparatus and method described in Ser. No. 296,688, "Apparatus for Batch-Fabricating Magnetic Film Heads and Method Therefor," by Abbott et al., filed Oct. 11, 1972, and commonly assigned.

BACKGROUND OF THE INVENTION

1. Field of the Invention

The invention relates to a magnetic head assembly.

2. Description of the Prior Art

In the cross-referenced Abbott et al. application, there are discussed the benefits made possible by thin film batch-fabricated magnetic heads. Also discussed are the problems of achieving the small dimensions and tolerances of such heads in a practical manufacturing environment. The solution is described as connecting groups of single-turn head elements deposited on a substrate together with conductive bridges. Electrical conduction through the bridges is monitored during fast rough grinding to the throat height dimension and, after the bridges break, the underlying element conductors are monitored. Grinding continues until the monitored value indicates that the final dimension has been reached. In one embodiment, the head oscillates during grinding. Additional advances have occurred in the art since the invention in the cross-referenced application was made. For example, new head surface contours cannot be obtained by oscillating the head during grinding. Also, new applications for single-track heads make techniques utilizing bridges spanning two or more elements impractical. It has become necessary to monitor electric current through a single-track magnetic head while the head is continuously rotating about an axis passing through the surface being formed.

Single-track, thin film, batch-fabricated magnetic heads are known. Bajorek et al. in an article in the October, 1973, IBM TECHNICAL DISCLOSURE BULLETIN at page 1372, describe a single-turn magnetoresistive recording head incorporating copper or gold conductors. Landler, in an article in the May, 1969, IBM TECHNICAL DISCLOSURE BULLETIN, pages 1792–1793, suggests monitoring the resistance of an extra conductor, surrounding a single-turn head, during lapping until current conduction is interrupted or becomes discontinuous. Landler appears to require four external leads.

A rotatable fixture for a multitrack magnetic head is described in U.S. Pat. No. 3,681,682 (C. M. Cox and R. B. Fischer, filed Dec. 21, 1970, issued Aug. 1, 1972, and assigned to International Business Machines Corporation). This fixture connects each track's winding, in turn, to testing equipment including impedance measuring circuits. A continuously rotating two-terminal carbon resistor is monitored by a Wheatstone bridge in U.S. Pat. No. 3,105,288 (D. E. Johnson and J. L. Owens, filed Feb. 27, 1959, issued Oct. 1, 1963, and assigned to Western Electric Company, Incorporated). Each resistor terminal is connected to the bridge through a single slip ring brush combination. A Kelvin bridge (Dawes, *Electrical Engineering*, pages 169–170, McGraw-Hill, 1952) provides vastly greater accuracy than a Wheatstone bridge, but requires four connections for a two-terminal, unknown resistance. Slip ring assemblies having more than one brush per ring are commercially available.

A Hall element head with material removable during manufacture is shown in U.S. Pat. No. 3,787,638 (M. Murai, filed Apr. 25, 1972, issued Jan. 22, 1974, and assigned to Pioneer Electronic Corporation). Murai shows only separate sets of leads for detection and measurement.

Thus, there is no suggestion in the prior art of a unified solution to the problem of monitoring, during surface formation, current through a head while it is in continuous rotation about an axis through the surface being formed.

SUMMARY OF THE INVENTION

This problem is solved by a single track magnetic head structure providing only one set of leads and two conductors for both testing (measurement, for example) and normal operating purposes (detecting, for example). Two nested elements are connected to the leads in parallel. The initial head surface lies to one side of both elements, and the final desired surface will be between the elements. The element lying between the two surfaces, which is ruptured during surface formation, is constructed of a very high conductivity material to accentuate the change in resistance, relative to the resistance of the other element.

The foregoing objects, features, and advantages of the invention will be apparent from the following more particular description of preferred embodiments of the invention, as illustrated in the accompanying drawings.

DESCRIPTION OF THE PREFERRED EMBODIMENTS

General Description

Figure 1:
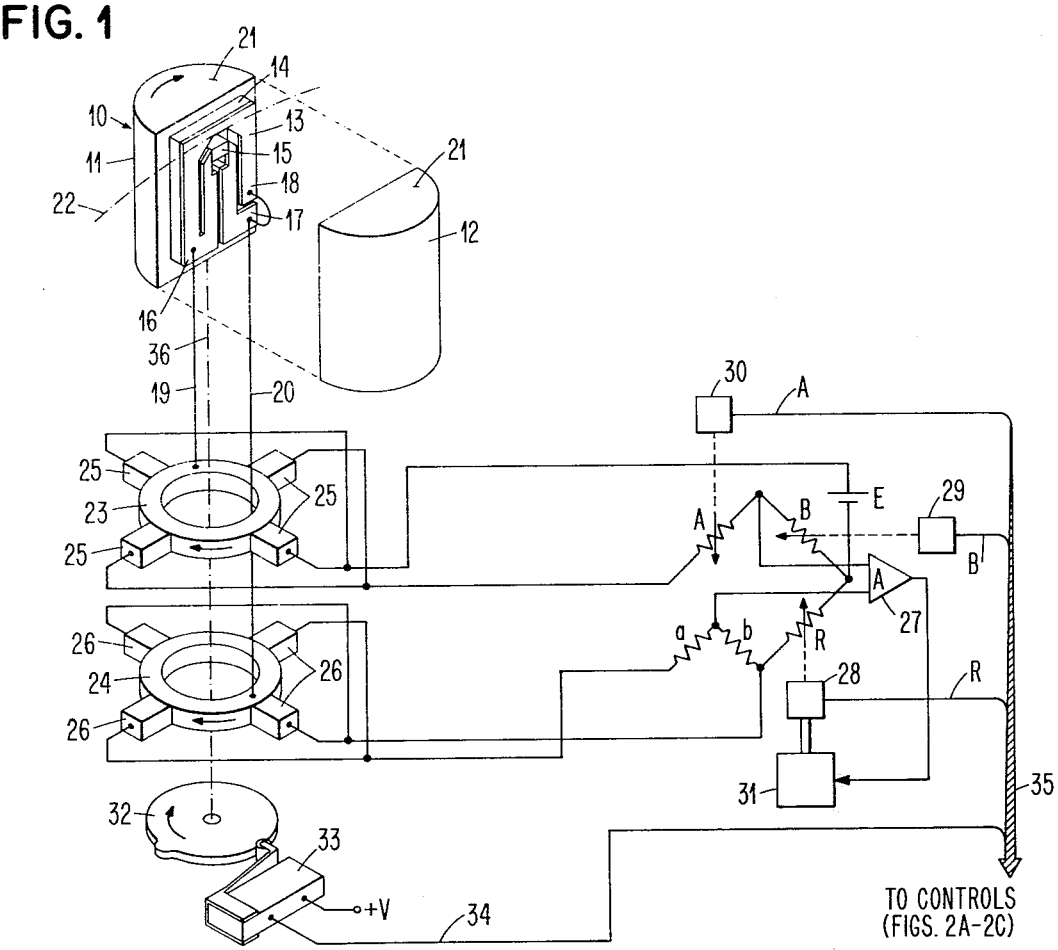
FIG. 1 schematically illustrates the tool, head and detection circuit used in the invention.

Referring first to FIG. 1, the invention will first be described schematically to explain the underlying principles. A head 10, shown split into two sections 11 and 12, includes layers 13 and 14 and a magnetoresistive element 15. The layer 13 is preferably a highly conductive material belonging to the class of those materials exhibiting the highest conductivity, such as gold, and is placed in intimate contact with another highly conductive material 14 which need not be as conductive, however, as the material of the layer 13. For example, the layer 14 may be copper. The layers 13 and 14 are placed on a surface of sections 11 and 12 which is constructed of a nonmagnetic, relatively nonconductive material such as plastic or ferrite. The layers 13 and 14 together form two three-segment, generally U-shaped sections. The outer U-shaped section may be viewed as ending at points 16 and 18, and the inner U-shaped section may be viewed as ending at points 16 and 17. The inner U-shaped section includes a magnetoresistive element but, depending on the type of head, it may be completely magnetoresistive or it may be a single-turn, purely conductive, element. The points 16 and 17 are externally connected to leads 19 and 20, and the points 17 and 18 are internally interconnected. For purposes of illustration, a wire is shown as interconnecting points 17 and 18, but alternatively, the depositing operation would merely close the gap between points 17 and 18. When the sections 11 and 12 are closed together, a plane 21 is defined. This is the starting surface prior to a finishing operation for forming a spherical surface contour generally indicated by the dashed line 22. The process of removing material from the top plane 21 to the curved plane 22 necessarily results in the rupture of the middle segment of the outer section.

The removal of the material is achieved by rotating the head 10 about a central axis 36 passing through the planes 21 and 22. The point at which the middle segment of the outer section is ruptured is monitored through leads 19 and 20 by a resistance bridge arrangement to be described. It is necessary, therefore, to make available to the bridge signals from the lines 19 and 20 during rotation of the head 10. This is accomplished by a pair of slip rings 23 and 24, each contacted by a plurality of brushes 25 and 26. As is well known in the art, a very accurate resistance measuring instrument is the Kelvin bridge; for example, one known commercially as the Keithley Ohmmeter. The Kelvin bridge's accuracy is achieved by providing four input terminals to measure an unknown quantity X. Two of the four terminals of the bridge are connected to the upper commutating ring or slip ring 23 via two pairs of brushes 25, each being connected together to reduce noise and improve sensitivity. Similarly, the other two bridge terminals are connected to the lower commutation ring or slip ring 24 by two pairs of brushes 26. The bridge provides an output through an amplifier 27 indicating by a null that the unknown resistance may be calculated from the values of variable resistors A, B and R in accordance with the relation $X=(A_R/B)$ (if the ratio A/B is the same as the ratio a/b). In normal operation, variable resistors A and B are preset in the range of the expected resistance value, and resistance R is varied until a null occurs. This may be performed by a motor 31 driven by the signal from the amplifier 27. As long as there is a signal from the amplifier 27, resistance R will be adjusted one way or the other, depending upon the signal polarity. Eventually the resistance R will be adjusted to provide a null from amplifier 27, and the unknown resistance X may be calculated.

This calculation is performed by the controls shown in FIGS. 2A–2C which will now be described. The positions of the resistors A, B and R are sensed by position indicators 28, 29 and 30 which place corresponding position signals on lines A, B and R of bus 35. The contacts of a switch 33 are also connected to the bus 35 via a wire 34. This switch is operated once for every revolution of cam 32 connected to the central axis 36 of the head 10.

Detailed Description of Structure

Figure 2A:
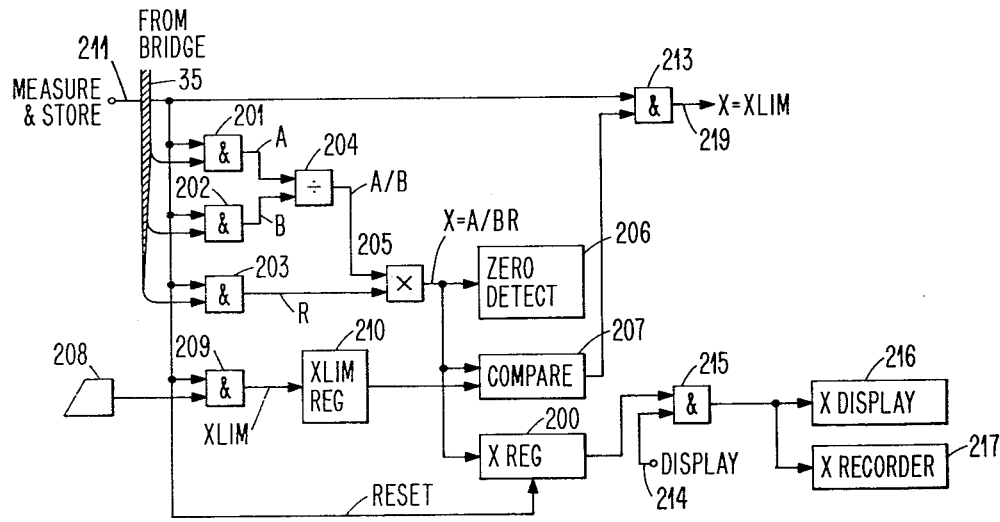
FIGS. 2A–2C are logic diagrams illustrating controls for operating the invention.

Referring now to FIG. 2A, there is illustrated one logic configuration capable of performing a calculation for determining the unknown resistance X. If desired, other configuration, or an appropriately programmed computer such as an IBM 1800 Data Processing System, may be substituted. For simplicity, the following explanation assumes the transfer of digital information through single blocks actually representing multiple parallel or serial positions. Signals on the bus 35 from the bridge are gated into AND circuits 201, 202 and 203 when a measure and store signal occurs on line 211 from additional controls in FIG. 2C, to be explained. The output of AND circuit 201 digitally represents the setting of resistor A, the output of AND circuit 202 digitally represents the setting of resistor B, and the output of AND circuit 203 digitally represents the setting of resistor R. The divide block 204 digitally calculates the ratio A/B and the multiple block 205 multiplies this ratio times R to give the digital quantity ($A_R/B$) which is then supplied to a zero detector 206, a comparator 207 and an X storage register 200. In the foregoing, it will be understood that digital representations could instead be analog. The output of the zero detector 206 is sensed whenever there is a measure and store signal on line 211 to give an output on line 219 indicating when the quantity X equals a predetermined quantity XLim. The XLim quantity, representing a predetermined resistance value, is stored in a register 210 via AND circuit 209 from an external entry mechanism such as a keyboard 208. The XLim register 210 contents and the calculated quantity X are compared in a comparator 207. The calculated quantity X is also stored in the X register 200, which is reset by every measure and store signal on line 211, and is gated by a signal on a display line 214 through AND circuit 215 to an X display 216 or an X recorder 217 or other visual display or recording mechanism.

Figure 2B:
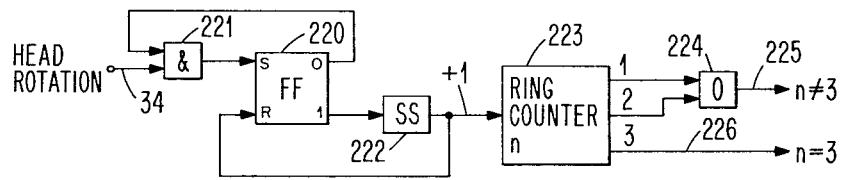

FIG. 2B shows a circuit for counting the number of head 10 rotations. In FIG. 1, the cam 32 operates the switch 33 to provide a single signal on the line 34 for each head rotation. In FIG. 2B, the output of AND circuit 221 sets a flip-flop 220 to the one state whenever a head rotation signal occurs on line 34 and then disables the AND circuit 221 via the zero output of the flip-flop 220. The one output of the flip-flop 220 causes a pulse from the single-shot 222 to step a three-position ring counter 223. The output of the single-shot 222 also resets the flip-flop 220 to enable it to receive the next head rotation signal. When the ring counter 223 output is either one or two, there will be an output $n \neq 3$ on line 225 from the OR circuit 224. There will be an output $n=3$ on line 226 when the ring counter 223 is set to position three.

Figure 2C:
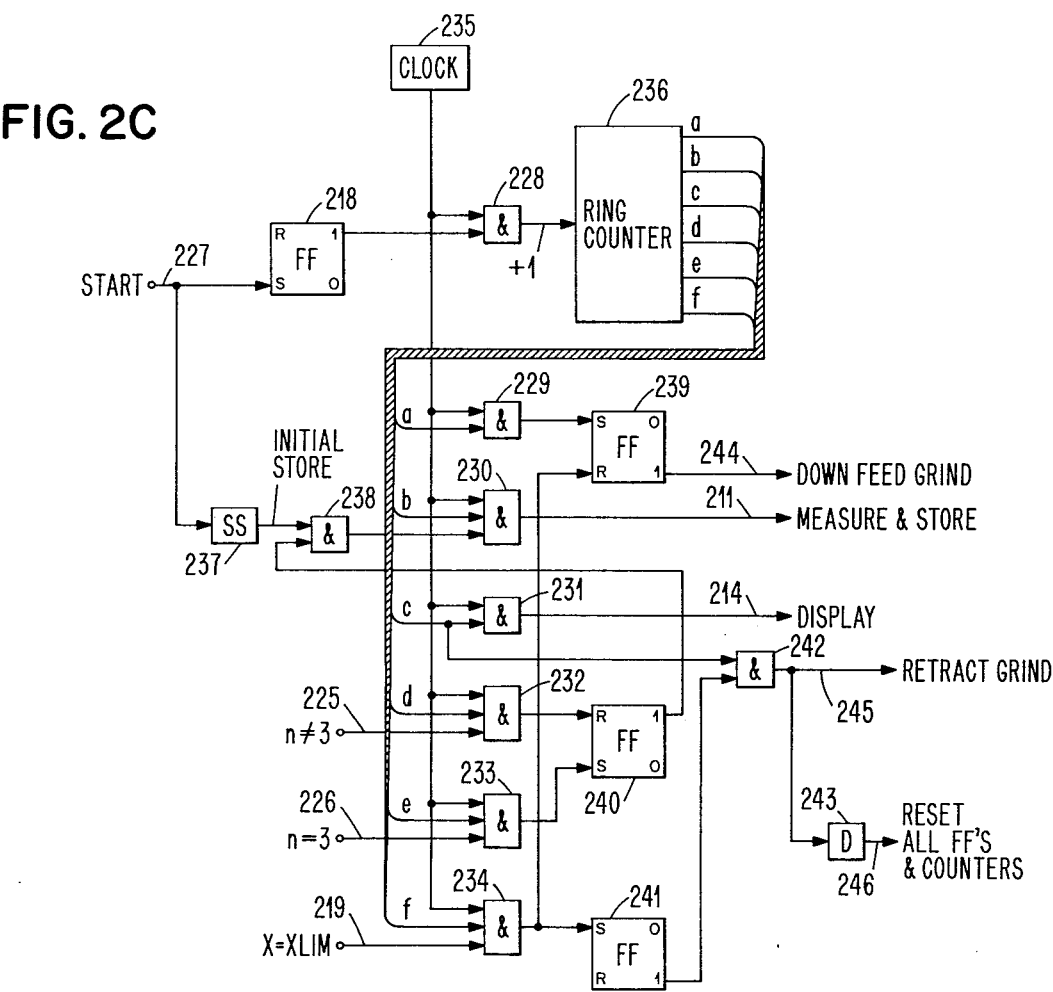

Referring to FIG. 2C, there is shown a logic diagram for utilizing and generating control signals necessary to the operation of the circuits of FIGS. 2A and 2B. Initially, all flip-flops and counters are reset by a signal from line 246 occurring at the end of a previous cycle of operation. A start signal on line 227 from an external source (not shown) sets the flip-flop 218 to the one condition, enabling AND circuit 228 to pass a series of clock pulses from a clock 223 which step a ring counter 236 from position to position in sequence. As the ring counter 236 is stepped, AND circuits 229-234 are enabled, one at a time, to pass a pulse from clock 235. Flip-flop 239 is set to place a signal on the line 244 and initiate a "down feed" grind when the ring counter 236 is in position *a* and a clock pulse occurs from the clock 235. AND circuit 230 causes a measure and store signal to occur on the line 211 at ring counter position *b*, upon the occurrence of a clock pulse from clock 235, after single-shot 237 supplies an initial store pulse or if a flip-flop 240 (indicating three head rotations) has been previously set to the one state. When ring counter 236 output *c* occurs, AND circuit 231 causes a display signal to appear on the output line 214 and AND circuit 242 is also enabled. AND circuit 242 is utilized if flip-flop 241 was previously set to the one state (if a limit indication X=XLim occurred on signal line 219 to AND circuit 234) to cause a retract grind signal on line 245 and, after a delay determined by delay circuit 243, to provide a signal on line 246 resetting all flip-flops and counters. At ring counter output *d*, the flip-flop 240 is held in the reset position via AND circuit 232 is the number of head turns has not yet reached three. At ring counter output *e*, the flip-flop 240 is set to the one state by an AND circuit 233, during a previous cycle of the ring counter 236, when there is an *n*=3 signal on line 226 indicating that a third head turn has occurred. At ring counter position *f*, flip-flop 241 is set to the one state if X=XLim.

Figure 3A:
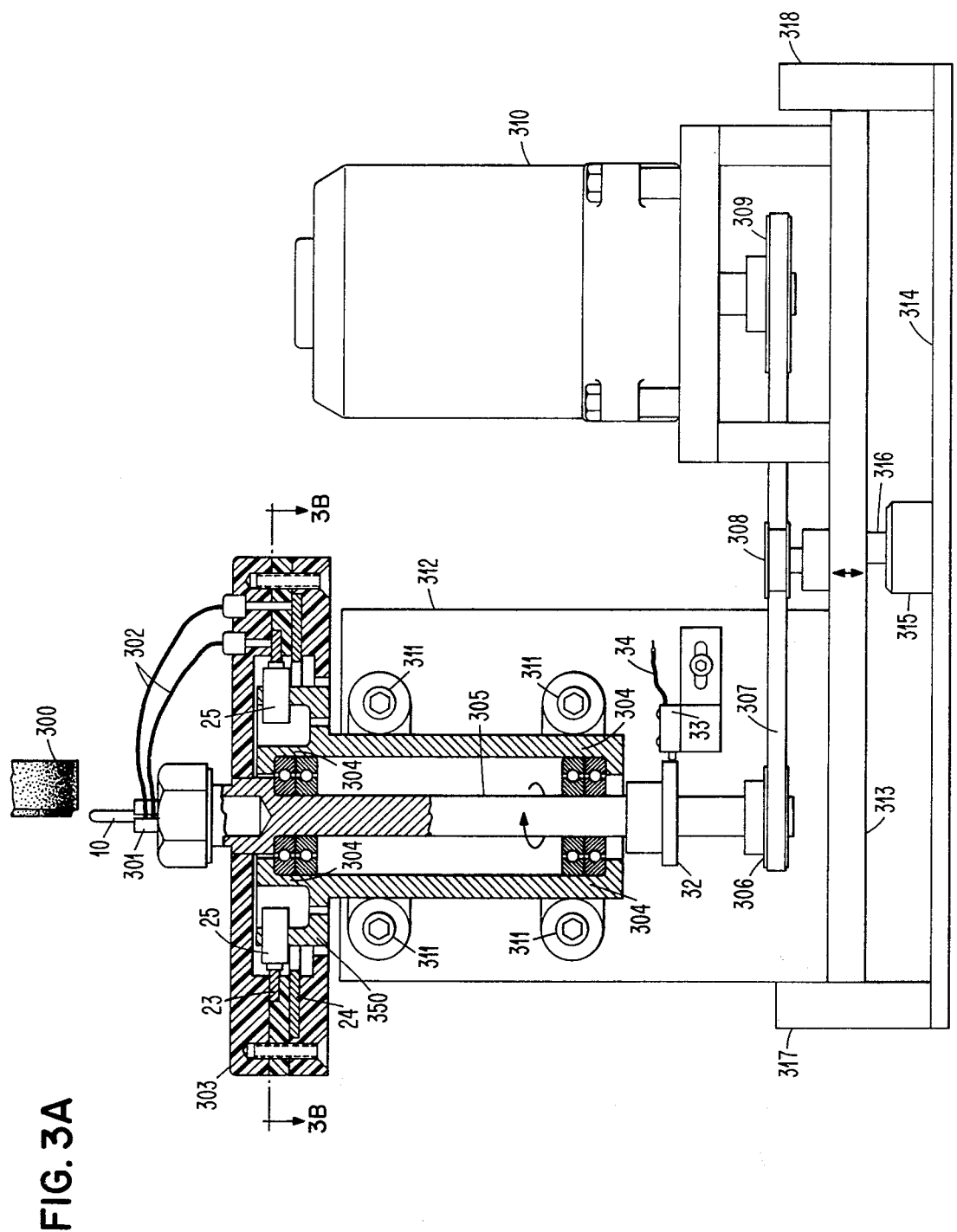
FIG. 3A includes a cross-sectional view of a tool used in the invention.
Figure 3B:
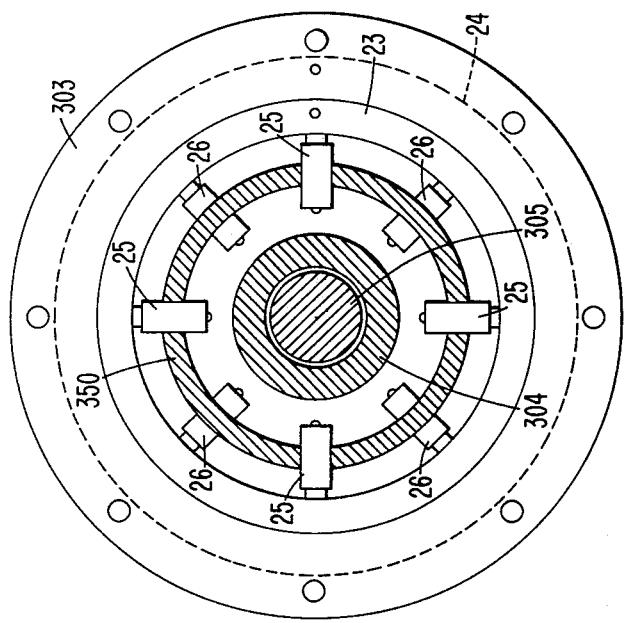
FIG. 3B is a cross-section through plane 3B—3B in FIG. 3A.

Referring now to FIG. 3A, there is shown a detailed view of a tool utilizing the invention. The head 10 is mounted in a collet 301 and connected via leads 302 to connectors attached to brushes 25 in contact with commutating or slip rings 23 and 24. Only the upper set 25 of two sets of brushes 25 and 26 is shown. This will be better understood if reference is made to FIG. 3B which is a cross-section through plane 3B—3B in FIG. 3A. A supporting, rotating armature 303 is shown surrounding, and attached to, a drive shaft 305. Upper brush assembly 25 and lower brush assembly 26 are stationary in a support 350 while the upper slip ring 23 and the lower slip ring 24 rotate with the armature assembly 303. Bearings are provided between the shaft 305 and a portion 304 of the support 350. The stationary support 350 is fastened to a base member 312 by means of bolts 311 or other fasteners. The shaft 305 is turned in the direction shown by a belt 307 which is driven by a motor 310. For illustration, pulleys 306, 308 and 309 are shown, but it is understood that these pulleys are the belt 307 may be replaced by a gear mechanism or the like. The shaft 305 also carries the cam 32 which operates the switch 33 to supply signals on line 34 for every turn of the shaft 305. The entire mechanism so far described may be mounted on a mounting plate 313 which is vertically movable relative to a stationary plate 314 restricted by guides 317 and 318. The motion may be obtained by means of a hydraulic actuator 315 driving a shaft 316 or equivalent mechanism such as solenoids, racks, etc. The vertical movement along an axial line through shaft 305 brings the head 10 into contact with a contoured surface of an illustrative grinding wheel 301 while the head is rotated by the motor 310. It will be understood that the grinding wheel 300 could instead be brought into contact with the head 10 by axially moving the grinding wheel toward the head while the head remains in a fixed vertical position. As an alternative, the grinding wheel 300 could be replaced by lapping tape or by other abrasive removal techniques such as abrasive blasting. The grinder may be a Gallmeyer and Livingston Model 350. The head is illustratively turned at 100 revolutions per minute, and, if lapping tape is used, it would be drawn lengthwise and also oscillated widthwise. The entire operation takes on the order of 30 to 45 seconds.

Detailed Description of Operation

The operation of the invention will now be described with reference to FIGS. 2A–2C. It will be understood that the descriptive operations control signals causing corresponding operations effecting FIGS. 1 and 3A.

Referring first to FIG. 2C, all counters and flip-flops are in the reset condition, and a quantity XLim=X is entered into the XLim register 210. A start signal 227 sets the flip-flop 218 to the one state, supplying clock pulses 235 to the ring counter 236 and sequentially selecting AND circuits 229–234. A signal on output line 224 initiates a down feed grind to begin the grinding operation. The next step of the ring counter 236 causes a signal on line 211, measure and store, after there have been three turns of the head as indicated by a signal on line 226 from FIG. 2B. The signal on the line 211, measure and store, causes (FIG. 2A) the quantities A, B and R on the bus 35 from the bridge to be calculated ($X=A_R/B$) and compared in the comparator 207 to the quantity X stored in the X limit register 210. The X register 200 is reset at this time, and the currently calculated quantity X is then stored therein. It is assumed that the first comparison will indicate that the grinding has not yet reached the desired relationship of resistance X to desired resistance (XLim=X). There will, thus, not be an output of the X=XLim line 219. When the ring counter 236 steps to the *c* position, the AND circuit 231 will generate a signal on display line 214 which activates AND circuit 215 to send the current contents of X register 200 to the X display 216 and the X recorder 217. When the ring counter 236 reaches *d*, the number of head turns as indicated by a signal on the lines 225 and 226 are tested and the flip-flop 240 is accordingly set. There will be another output from the flip-flop 240 only if the number of turns as indicated by a signal on line 226 equals three, in which case there will be another measure and store signal 211. Otherwise, there will not be a measure and store signal. When the ring counter 236 steps to position *f*, flip-flop 241 will be set to the one state only if the quantity calculated and stored in the X register 200 equals the quantity X stored in the X limit register 210. The operation is repeated if this does not occur. If, however, XLim=X, the flip-flop 241 is set to the one state, and the AND circuit 242 will, at the next *c* time of the ring counter 236, cause the grinder to retract. Subsequently, all flip-flops and counters are reset.

While the invention has been particularly shown and described with reference to preferred embodiments thereof, it will be understood by those skilled in the art that various changes in form and details may be made therein without departing from the spirit and scope of the invention.

What is claimed is:

1. A single track magnetic head, for transducing magnetic indicia and electrical signals through two external leads, which during manufacture has an initial surface dimension greater than that finally required and which surface dimension is reduced by: an abrasive material, means providing relative motion between the head and the abrasive material at least by continuously rotating the head, about an axis through aforesaid surface, against the abrasive material to remove surface material, means for monitoring the resistance of the head, including the resistance of at least a portion of an outer element of the head, and means for stopping relative motion when the monitored resistance approaches a predetermined value; said head during manufacture comprising:

- a nonconductive, nonmagnetic, generally solid housing having a top surface defining the initial surface dimension;
- an outer, highly conductive, generally U-shaped, three-segment element, embedded in said housing, having the middle segment adjacent the top surface of the housing, said outer element being ruptured during surface material removal;
- an inner, conductive, generally U-shaped, three-segment element, embedded in said housing and nested within, and in the plane of, the outer element, having the middle segment adjacent the middle segment of the outer element and separated therefrom;
- a pair of conductive means each interconnecting one of the respective adjacent ends of each of outer and inner elements at a point; and
- a pair of external leads connected to said two points for permitting monitoring of the elements' resistance through no more than said two points, during surface material removal, until the outer element is reptured, and permitting conduction of electrical signals through said two points during operation of the head.

2. The magnetic head of claim 1, wherein the middle segment of the inner element includes a magnetoresistive material having substantially less conductivity than the outer element.

3. A two-lead magnetic head, comprising a transducer mounted in a housing, for transducing magnetic indicia and electrical signals, which during manufacture has an initial surface dimension greater than that finally required and which surface dimension is reduced by an abrasive material, means providing relative motion between the head and the abrasive material at least by continuously rotating the head, about an axis through aforesaid surface, against the abrasive material to remove surface material, means for monitoring the resistance of the head, including the resistance of at least a protion of an outer element of the head, and means for stopping relative motion when the monitored resistance approaches a predetermined value; said magnetic head during manufacture comprising:

- an outer, highly conductive, generally U-shaped, three-segment element, having the middle segment adjacent the initial surface dimension, said outer element being ruptured during surface material removal;
- an inner, conductive, generally U-shaped, three-segment element, nested within, and in the plane of, the outer element, having the middle segment adjacent the middle segment of the outer element and separated therefrom;
- a pair of conductive means each interconnecting one of respective adjacent ends of each of outer and inner elements; and
- two leads, each connected to the element ends at no more than one point on one of said conductive means, for permitting monitoring of the elements' resistance, during surface material removal, until the outer element is ruptured, and permitting conductive of electrical signals during operation of the transducer.

* * * * *

UNITED STATES PATENT OFFICE
CERTIFICATE OF CORRECTION

Patent No. 3,955,213          Dated May 4, 1976

Inventor(s) Ralph D. Brower et al.

It is certified that error appears in the above-identified patent and that said Letters Patent are hereby corrected as shown below:

Column 5, line 14, "retract" should read --"retract"--.

Column 3, line 47, "X=($A_R$/B)" should read --X=$\frac{A}{B}$R--.

Column 4, line 22, "($A_R$/B)" should read --$\frac{A}{B}$R--.

Column 5, line 18, "is" (second occurrence) should read --if--.

Column 8, lines 31 and 32, "conductive" should read --conduction--.

Signed and Sealed this

Thirteenth Day of September 1977

[SEAL]

Attest:

RUTH C. MASON      LUTRELLE F. PARKER
*Attesting Officer*      *Acting Commissioner of Patents and Trademarks*

UNITED STATES PATENT AND TRADEMARK OFFICE
CERTIFICATE OF CORRECTION

PATENT NO. : 3,955,213

DATED : May 4, 1976

INVENTOR(S) : Ralph D. Brower et al.

It is certified that error appears in the above—identified patent and that said Letters Patent is hereby corrected as shown below:

Column 8, line 10, "protion" should read -- portion --.

Signed and Sealed this

Twenty-first Day of July 1981

[SEAL]

Attest:

GERALD J. MOSSINGHOFF

Attesting Officer

Commissioner of Patents and Trademarks